Aug. 25, 1953 — W. A. MILLER — 2,649,620
CASTING EXPANDED PLASTICS
Filed Aug. 1, 1951 — 3 Sheets-Sheet 1
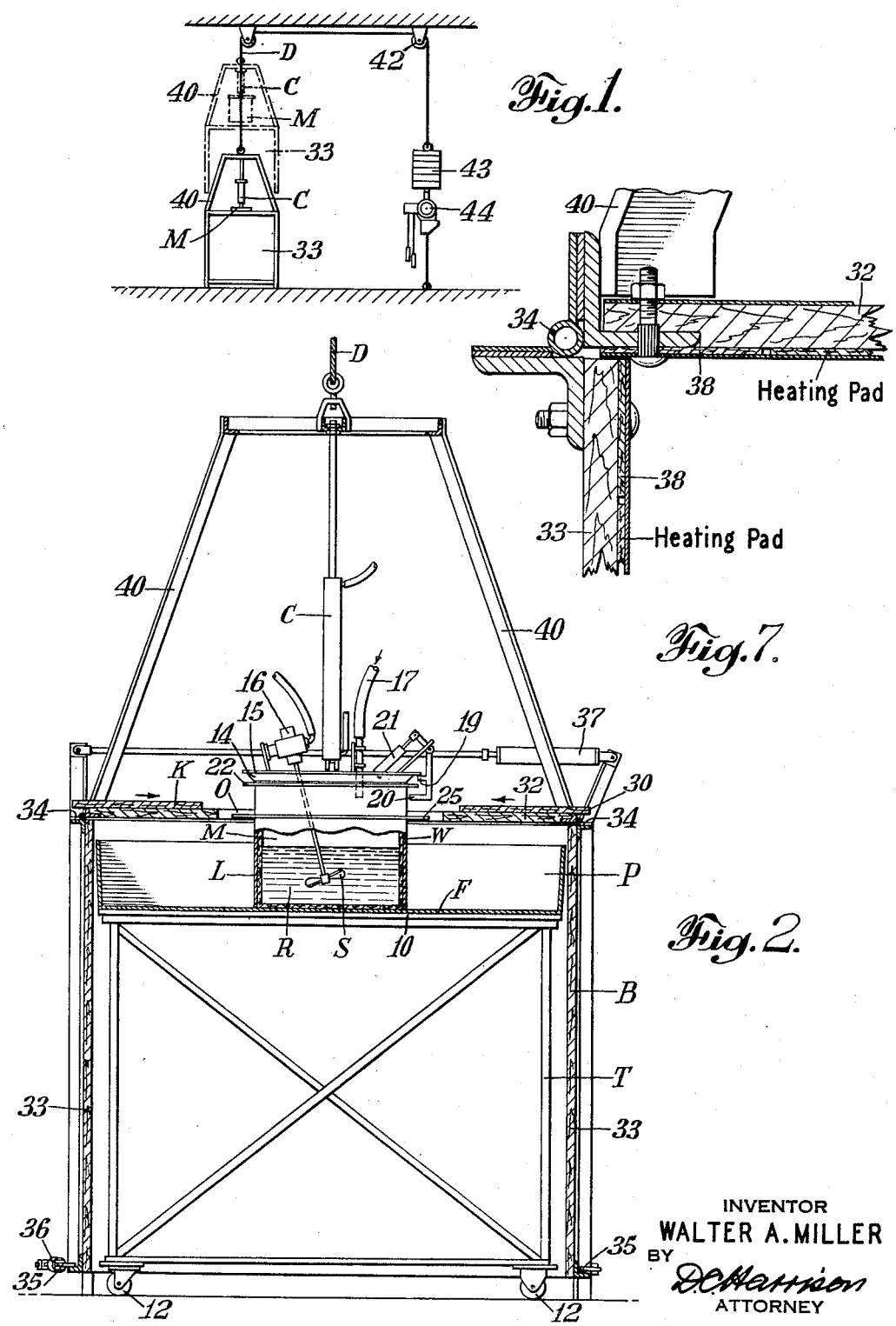
INVENTOR
WALTER A. MILLER
BY
ATTORNEY

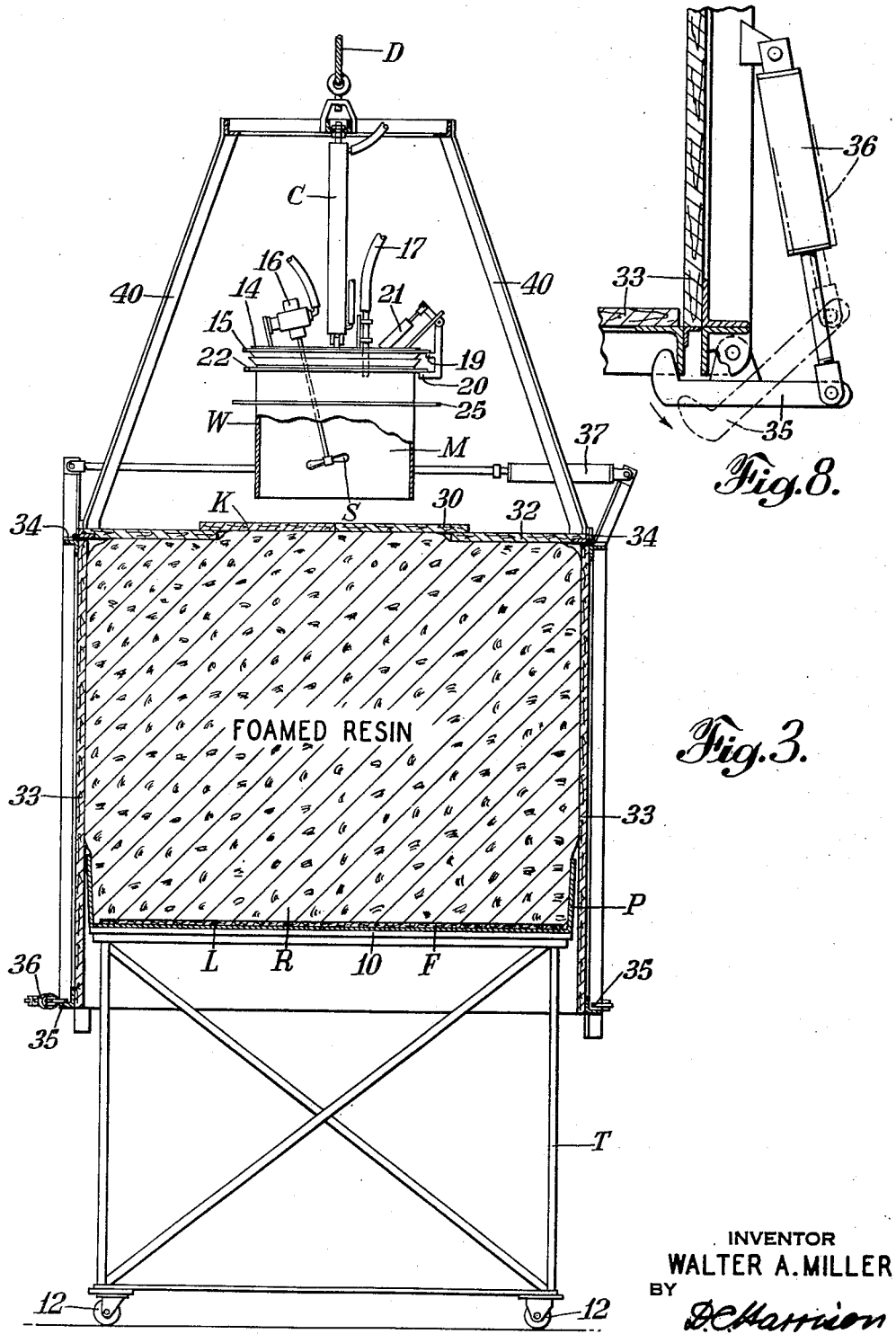

Aug. 25, 1953 W. A. MILLER 2,649,620
CASTING EXPANDED PLASTICS
Filed Aug. 1, 1951 3 Sheets-Sheet 3
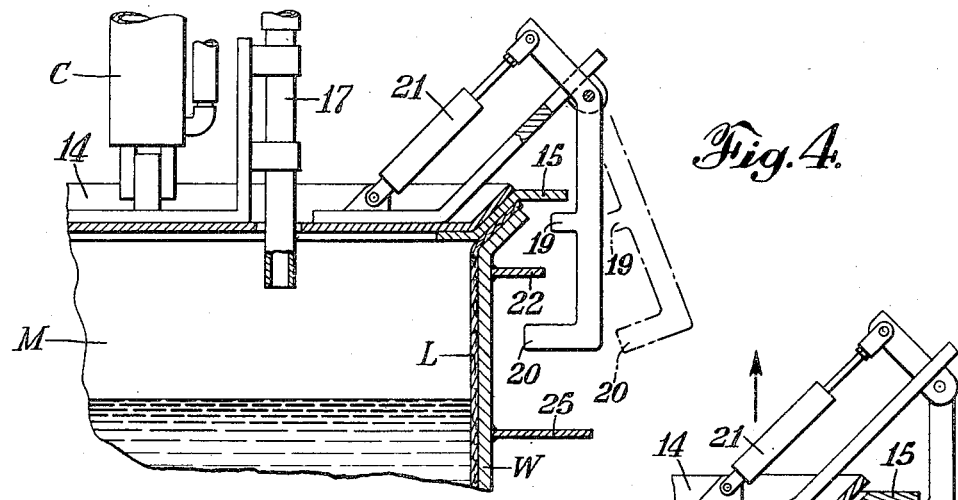
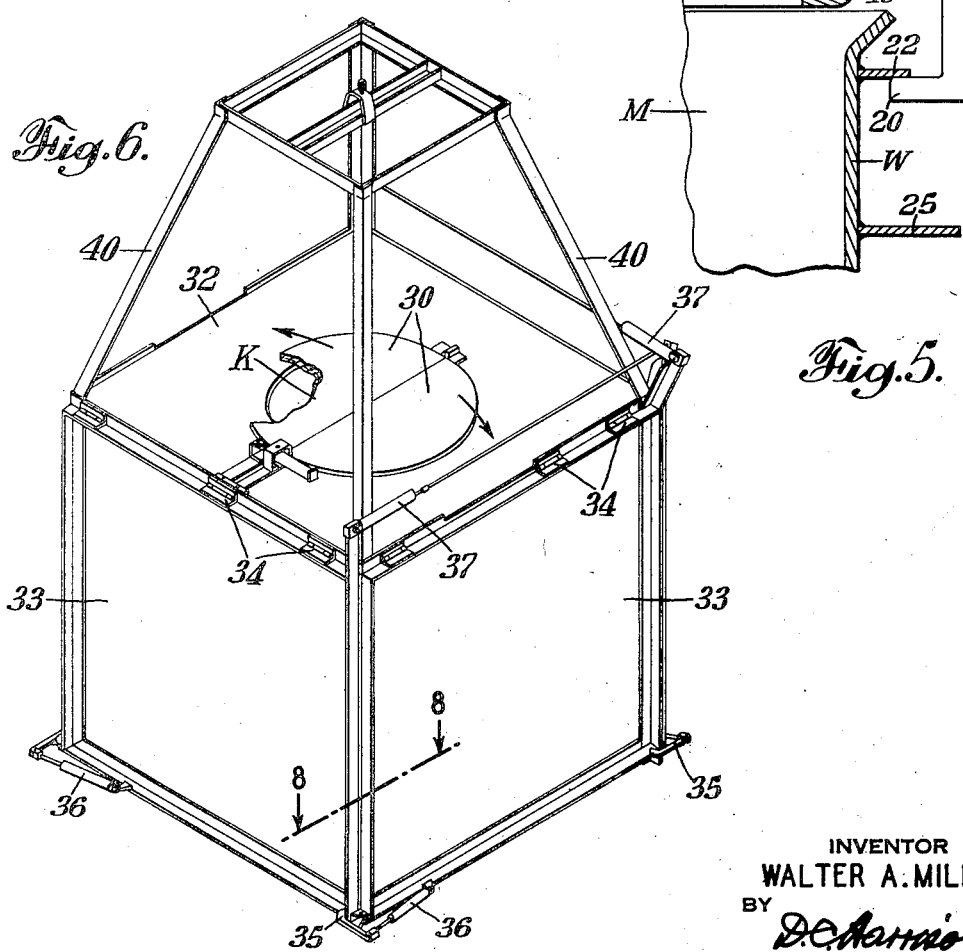
INVENTOR
WALTER A. MILLER
BY
ATTORNEY Patented Aug. 25, 1953

2,649,620

UNITED STATES PATENT OFFICE 2,649,620

CASTING EXPANDED PLASTICS

Walter Arthur Miller, Bloomfield, N. J., assignor to Union Carbide and Carbon Corporation, a corporation of New York Application August 1, 1951, Serial No. 239,784

5 Claims. (Cl. 18—26)

This invention relates to casting expanded plastics, and more particularly to method and apparatus for casting foamed plastics such as catalyzed resins.

It has been proposed to cast a block of foamed resin by mixing a batch of resin and catalyst in a steel container and then rapidly pouring the mixture into a form, or foaming the mixture from the container into the form. Imperfections in the block of the foam have been attributed to the cling to the container of the last five to ten percent of the material which slowly pours into the form after the major portion of the material is already in the form. This cooling of the cling or the retarded action of the material causes the foaming mass to be uneven in its reaction, with resulting tears and voids. Furthermore, some of the material remains in the container, as much as a ten to fifteen percent loss due to cling waste, and also requiring cleaning of the container with consequent expense and delay.

Objects of the present invention are to expedite the transfer of catalyzed resin from a mixing chamber to a form, to avoid the difficulties of cling to the mixing chamber, to avoid the slowing up or stringing out of the resin, to avoid cling losses of resin remaining in the mixing chamber, and to avoid cleaning of the mixing chamber.

Large blocks of low density foamed resin when made by casting in open topped forms have large domed tops. For efficient slabbing operations, flat tops are required. When the block is cast in a closed topped form having the dimensions of the desired block, the upper corners are rounded because they are formed last and it is then too late to fill the top corners due to the increased viscosity of the resin.

Other objects of the present invention are to provide flat tops and square corners on blocks of foamed resin, to provide a telescopic mold for blocks of foamed resin, and to provide expansible or pivoted sides for the foamed resin mold.

According to one phase of the present invention, a block of foamed resin is cast by placing a continuous rigid upstanding wall on the floor of a molding pan to surround a relatively small area thereof and form therewith a take-apart mixing vessel, lining the inside of said wall and the area of pan floor surrounded thereby with a thin sheet of expendable film to form a continuous liner for said mixing vessel, charging a mass of resin into said lined mixing vessel, stirring into said charged mass of resin a fast foaming catalyst, promptly lifting the film supporting wall to raise it off the floor of the pan and slide it upwardly relative to the liner and the catalyzed mass of resin therein until the wall clears the top of the liner, whereby the liner collapses to flatten out and permit the catalyzed resin to spread radially over the greater area of the floor of the molding pan.

According to another phase of the invention, a block of foamed resin is cast by supporting an open topped molding pan in elevated position, telescoping over the molding pan an open bottomed box having the top resting on the rim of the pan and sides depending below the bottom of the pan, charging through a charging opening a mass of catalyzed foamable resin into the pan inside said box, and closing the charging opening, whereby the foaming action first fills the corners of the pan, then fills the corners of the box, and further reaction lifts the box and fills the sides thereof above the rim of the pan to form the sides of the block.

Other objects and features of novelty will be apparent from the following description and the accompanying drawings, in which:

Fig. 1 is a diagram of apparatus according to, and for carrying out the method of, the present invention;

Fig. 2 is an elevation of the apparatus in position before the foaming operation;

Fig. 3 is a similar view of the apparatus in position after the foaming operation;

Fig. 4 is a detail of the charging apparatus in position before the liner is released;

Fig. 5 is a similar view of the same in position after the liner is released;

Fig. 6 is a perspective view of the box mold shown in Figs. 1, 2 and 3;

Fig. 7 is a detail of the hinged wall for the box mold shown in Fig. 6; and

Fig. 8 is a detail of the box side latch shown in Fig. 6.

As shown in Fig. 2, a molding pan P is supported in an elevated position by a truck T. An open bottomed box B is telescoped over the pan P with the top of the box resting on the rim of the pan and the sides of the box depending below the bottom of the pan. A continuous rigid upstanding wall W is lowered through a charging opening O in the top of the box B, and is thereby placed on the floor F of the pan P to surround a relatively small area thereof and form therewith a take-apart mixing chamber M. The inside of the wall W and the area of the floor F surrounded thereby is lined with a thin sheet of expendable film to form a continuous liner L for the mixing vessel M. A batch of resin R is charged into the lined mixing vessel M, and a fast foaming catalyst is stirred into the charged mass by means of a stirrer S.

The wall W is lifted by a cylinder C to raise it off of the floor F and slide it upwardly relative to the liner L and the catalyzed mass of resin therein until the wall W clears the top of the liner L, whereby the liner collapses to flatten out and permit the catalyzed resin to spread radially over the greater area of the floor F.

The opening O is closed by a cover K, and the foaming action first fills the corners of the pan P to form the lower corners of the block, then fills the corners of the box B to form the upper corners of the block, and further reaction lifts the box and fills the sides thereof above the rim of the pan to form the upper portions of the sides of the block.

The sides of the box are swung out about hinges on the top of the box, and the opened box is lifted by the cable D to clear the finished block.

The molding form or foaming pan P is preferably of aluminum sheet welded construction, and secured to the top of the stand or truck T, a heating unit 10 being located under the floor F of the pan. The truck T is provided with castors 12, to facilitate movement into and out of foaming position.

The wall W is a cylindrical shell or bottomless bucket, and the liner L is preferably a flat sheet .0015 inch thick polyethylene film, pleated on the sides to form the liner. The wall W is fitted with a cover 14 and a sealing ring 15, which engages and holds the upper pleated edges of the liner, as shown in Fig. 4. The stirrer S is driven by a motor 16 mounted on the cover 14. Also mounted on the cover 14 is a catalyst inlet pipe 17. A differential lifting mechanism is pivoted on the cover 14 and comprises hooks 19 and 20, and an air cylinder 21 for swinging the hooks about their pivot is also mounted on the cover 14. The wall W has a flange 25 which fits over the opening O when the wall is lowered. After the catalyzed resin is mixed ready to charge the pan P, the cylinder C lifts the cover 14 and the hook 19 lifts the sealing ring 15, releasing the liner L. The hook 20 then engages a flange 22 on the wall W and rapidly raises the wall W to let the liner L and the charged mass of resin therein slide out and spread over the floor F. As soon as the wall W clears the top of the box B, a trap-door 30 is operated to close the opening O.

The box B comprises a top 32 and sides 33 pivoted to the top by hinges 34. The sides 33 are secured to each other at the corners by latches 35 operated by air cylinders 36, and the sides are swung outwardly by air cylinders 37. The top 32 and sides 33 are provided with heating pads 38. The top 32 is provided with a yoke 40 to receive the cable D, which as shown in Fig. 1 passes over pulleys 42 to a counterweight 43 and a hoist 44.

I claim:

1. Method of casting a block of expanded plastic, which comprises placing a continuous rigid upstanding wall on the floor of a molding pan to surround a relatively small area thereof and form therewith a take-apart mixing vessel, lining the inside of said wall and the area of the pan floor surrounded thereby with a thin sheet of expendable film to form a continuous liner for said mixing vessel, charging a mass of expanding plastic into said lined mixing vessel, lifting the film supporting wall to raise it off the floor of the pan, continuing the lifting of the wall to slide it upwardly relative to the liner and the expanding mass of plastic therein until the wall clears the top of the liner, spreading the liner to flatten out over a coextensive area of the floor, and spreading the expanding plastic radially of the floor of the pan.

2. Method of casting a block of expanded plastic, which comprises supporting a molding pan in elevated position, telescoping over the molding pan an open bottomed box having a top above the rim of the pan and sides depending therebelow, charging a mass of expanding plastic into the pan inside said box, filling the corners of the pan and then the corners of the box by the expanding action of the plastic, lifting the box and filling the sides thereof above the rim of the pan by further expanding action of the plastic to form the sides of the block, and during the expanding action heating the sides of the box to minimize skin losses.

3. Method of casting a block of expanded plastic, which comprises supporting the pan in elevated position, telescoping over the molding pan an open bottomed box having a top above the rim of the pan and sides hinged to the top and depending therebelow, securing the edge of each side to its adjacent sides, charging a mass of expanding plastic into the pan inside said box, first filling the corners of the pan by the expanding action to form the lower corners of the block, then filling the corners of the box by further expanding action to form the upper corners of the block, and lifting the box and filling the sides thereof above the rim of the pan by still further expanding action to form the upper portions of the sides of the block, releasing the edges of each side from its adjacent sides, and swinging the released sides outwardly about their hinges on the box top to release the finished block of expanded plastic.

4. Method of casting a block of foamed resin in an open topped molding pan, which comprises supporting the pan in elevated position, telescoping over the molding pan an open bottomed box having a top above the rim of the pan and sides depending therebelow, inserting through an opening in the box top a continuous rigid upstanding wall to rest on the floor of the pan to surround a relatively small area thereof and form therewith a take-apart mixing vessel, lining the inside of said wall and the area of the floor surrounded thereby with a thin sheet of expendable film to form a continuous liner for said mixing vessel, charging a mass of resin into said lined mixing vessel, stirring into said charged mass of resin a fast foaming catalyst, promptly lifting the film supporting wall through said box top opening to raise it off the pan floor and slide it upwardly relatively to the liner and the catalyzed mass of resin therein until the wall clears the top of the liner and the box top, and closing the box top opening, spreading the liner to flatten out and over a coextensive area of the floor, and spreading catalyzed resin radially over the greater area of the floor of the pan and by the foaming action first filling the corners of the pan to form the lower corners of the block, then filling the corners of the box to form the upper corners of the block, and by further reaction lifting the box and filling the sides thereof above the rim of the pan to form the upper portions of the sides of the block.

5. Apparatus for casting a block of expanded plastic, comprising a molding pan having a relatively large floor area, a continuous rigid upstanding wall on the floor of the pan surrounding a relatively small area thereof and forming therewith a take-apart mixing vessel having a thin sheet of expendable film lining the inside of said wall and the area of pan floor surrounded thereby to form a continuous liner for said mixing vessel adapted to receive a charged mass of plastic, and means for lifting the film supporting wall to raise it off the floor of the pan and slide it upwardly relative to the liner and the mass of plastic therein until the wall clears the top of the liner, whereby the liner may spread to flatten out and permit the plastic to spread radially of the floor of the pan.

WALTER ARTHUR MILLER.

References Cited in the file of this patent

UNITED STATES PATENTS

| Number | Name | Date |
| --- | --- | --- |
| 1,515,475 | Goodwin | Nov. 11, 1924 |
| 1,818,372 | Battilani | Aug. 11, 1931 |
| 1,877,527 | Moran | Sept. 13, 1932 |
| 2,271,498 | Overstreet | Jan. 27, 1942 |